April 29, 1969 KANAME KITSUDA 3,441,157
AUXILIARY MEANS FOR INSTALLING AND DISMANTLING A WHEEL OF A CAR
Filed Oct. 26, 1966 Sheet 1 of 3

INVENTOR.
Kaname Kitsuda
BY
Michael J. Striker

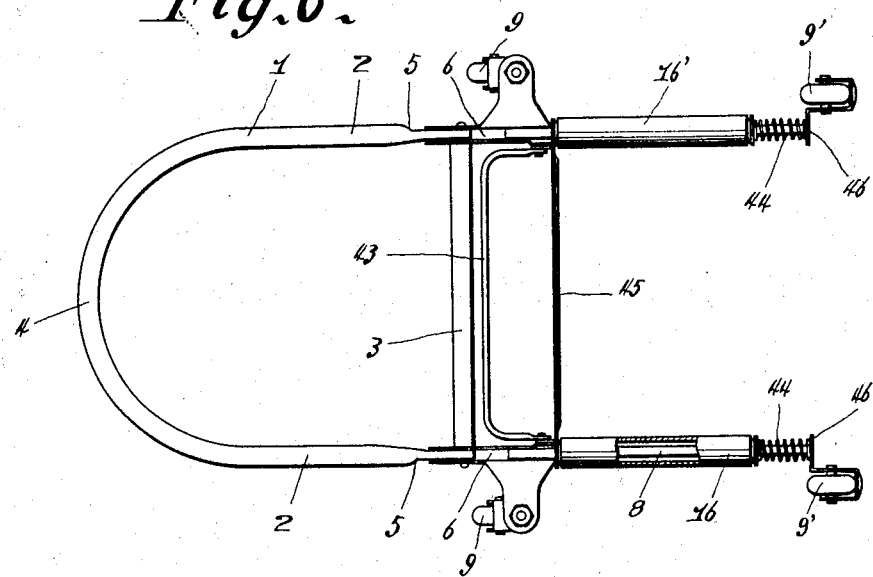
Fig. 6.
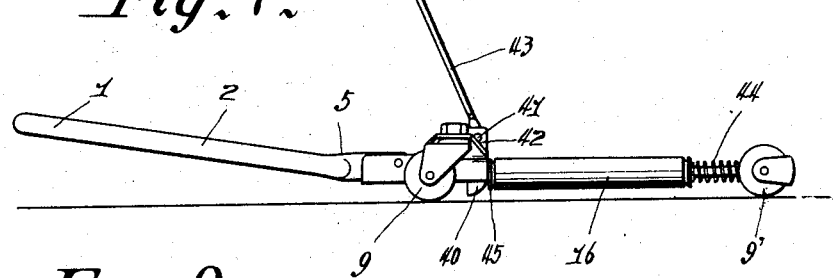
Fig. 7.
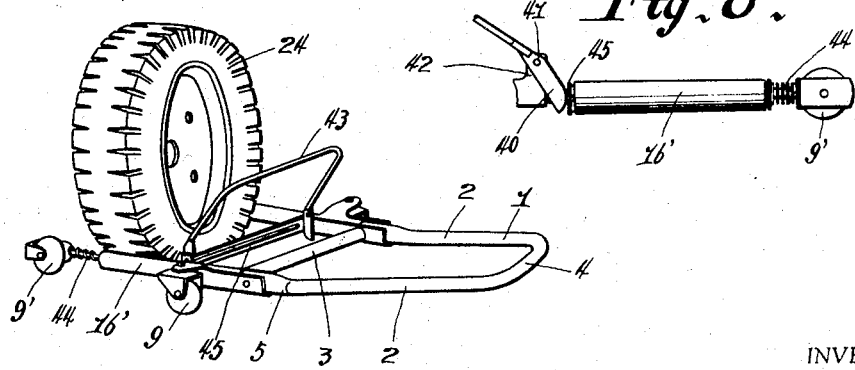
Fig. 9.
Fig. 8.

United States Patent Office 3,441,157
Patented Apr. 29, 1969

3,441,157
AUXILIARY MEANS FOR INSTALLING AND
DISMANTLING A WHEEL OF A CAR
Kaname Kitsuda, 115 Shinshuka, Hiratsuka-shi,
Kanagawa-ken, Japan
Filed Oct. 26, 1966, Ser. No. 589,751
Claims priority, application Japan, Nov. 15, 1965,
40/70,097
Int. Cl. B60b 29/00
U.S. Cl. 214—332                                 9 Claims

ABSTRACT OF THE DISCLOSURE

The invention relates to an auxiliary means for installing and dismantling a tire and wheel of a car and comprises a frame having a forward portion adapted to be positioned adjacent the tire and wheel and a rear or handle portion for operation of the device. The forward portion includes roller means adapted to engage the periphery of the tire and movable, either through rotation of one of the rollers or slidable to move the wheel and tire axially, and operator controlled means is provided whereby the roller means can be operated by an operator.

This invention relates to an auxiliary means for installing and dismantling a tire and wheel of a car, particularly, an automobile.

One object of this invention is to provide an auxiliary means for installing and dismantling a tire and wheel of a car, which facilitates such operations regardless of the size and weight of the wheel.

Another object of this invention is to provide an auxiliary means for installing and dismantling a tire and wheel of a car, whereby such operations are made far less laborious and prompt.

Still another object of this invention is to provide an auxiliary means for installing and dismantling a tire and wheel of a car, which facilitates the transfer of a dismantled tire and wheel, which tends to prevent the operator from being dirtied.

Further another object of this invention is to provide an auxiliary means for installing and dismantling a tire and wheel of a car, which is adapted to be portable, for example, in a trunk of an automobile so as to be ready to use for installing and dismantling the tire and wheel of said automobile.

Briefly stated in accordance with one aspect of this invention, there is provided an auxiliary means for installing and dismantling a tire and wheel of a car, comprising a frame which comprises a handle portion and a front or operating portion and the handle portion may comprise a pair of longitudinal members and at least two lateral members, each of the longitudinal members having an upward bend in a part near a connecting corner of the front lateral member therewith, respectively and extending frontwards into an arm. Two cylindrical rollers are rotatively mounted on the front portion of the arms arranged in parallel with each other, respectively, and a pair of rotatory wheels mounted on the frame so as to move the means longitudinally, and the rear lateral member of the frame being adapted to be used as a handle for operating the means longitudinally in co-operation with the wheels.

The invention will be better understood and other objects and additional advantages of the invention will become apparent upon perusal of the following description taken in connection with the drawings, in which:

FIG. 6 is a plan view of another embodiment of this invention for exchange of a small wheel of a car;

FIG. 7 is a left side elevation view thereof;

FIG. 8 is a partly removed view similar to FIG. 7 but showing another position of the cylindrical roller; and FIG. 9 is a perspective view thereof for explaining exchange of a wheel.

Figure 1:
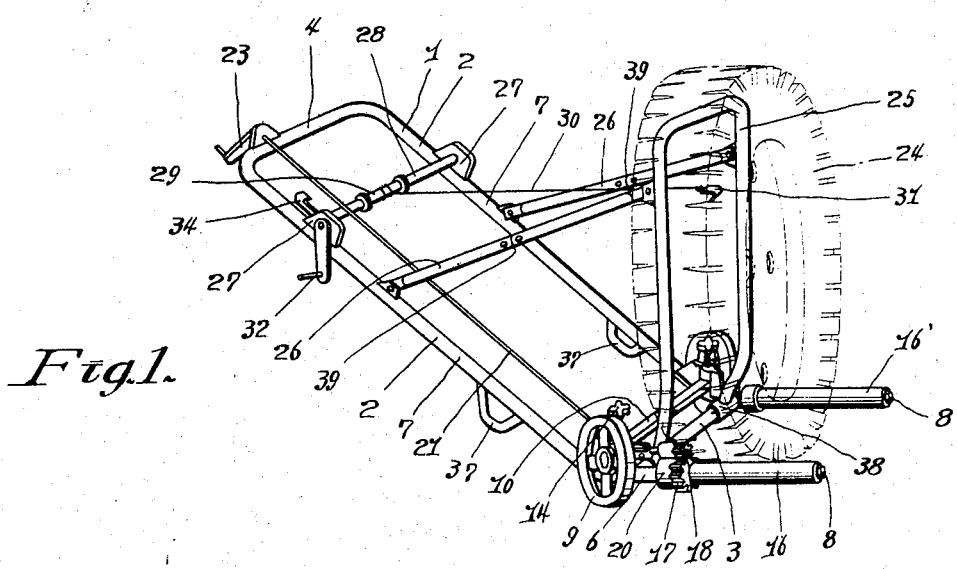
FIG. 1 is a perspective view of an embodiment of this invention in an operating position.
Figure 2:
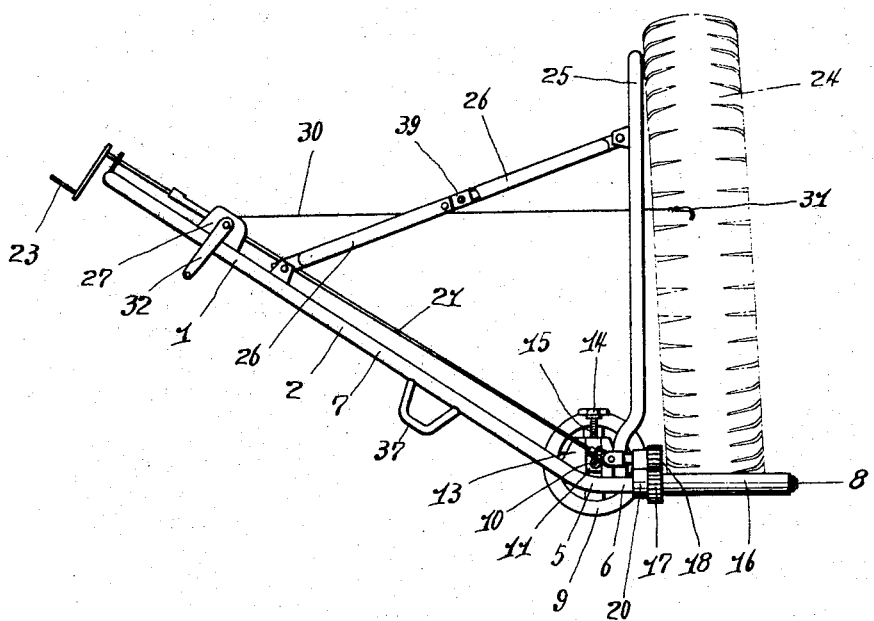
FIG. 2 is a left side elevational view thereof.

Referring first to the preferred form of the invention shown in FIGS. 1 to 5, inclusive, there is illustrated a main frame 1 comprising a pair of longitudinal members 2, 2 and a front lateral member 3 and a rear lateral member 4. The front lateral member 3 is arranged laterally between and at a right angle to the pair of longitudinal members 2, 2 and the rear lateral member 4 is roundly integrated with the pair of said longitudinal members 2, 2. Each of the longitudinal members 2, 2 has an upward bend 5 in a part near a connecting corner of the front lateral member 3 therewith and extends forwards into an arm 8, respectively. The rear lateral member 4 serves as a handle for moving the means of this invention on the whole longitudinally. The longitudinal members 2, 2 are divided into a front part 6 and a rear part 7 on opposite sides of upward bend 5, respectively. There is provided a guide member 13 on the upper side of the upward bend 5 of each longitudinal member 2, in which a vertical slot is formed. The guides 12 of the vertical slot are adapted to carry a bearing 11 which is vertically slidable in the vertical slot. The bearing 11 carried in the vertical slot in the above manner is raised and lowered by means of an adjusting screw 15 screwed vertically through the top part of the guide member 13. There is provided a knob 14 on the top of the adjusting screw 15. There is an axle 10 arranged in parallel with the front lateral member 3, which is extended rotatably through and journalled by the two bearings 11 and provided with a wheel 9 on each end thereof for moving the auxiliary means on the whole longitudinally, generally in co-operation with the rear lateral member 4. By virtue of the adjustable position of the axle 10, it is possible to raise or lower the frame 1 with respect to the ground on which the wheels 9 of the means are placed.

A pair of rotatable cylindrical rollers 16 and 16' are mounted on the arms 8 with interposed ball-bearings, as shown. A gear 17 concentrically and integrally secured to the rearmost end of the cylindrical roller 16 is adapted to be engaged with another gear 18 having a shaft 19. A bearing member 20 is secured to the arm 8 through which the shaft 19 is also journalled so as to keep the two gears 17 and 18 in mesh with each other always. The shaft 19 is extended rearwards and connects with a longitudinal rotatable rod 21 by the medium of a universal joint 22. The rearmost end of the longitudinal rotatable rod 21 is rotatably journalled on the rear lateral member 4 and provided with a handle 23 at the extremity. By such connecting construction as above, it is possible to rotate the cylindrical roller 16 by turning the handle 23.

Figure 3:
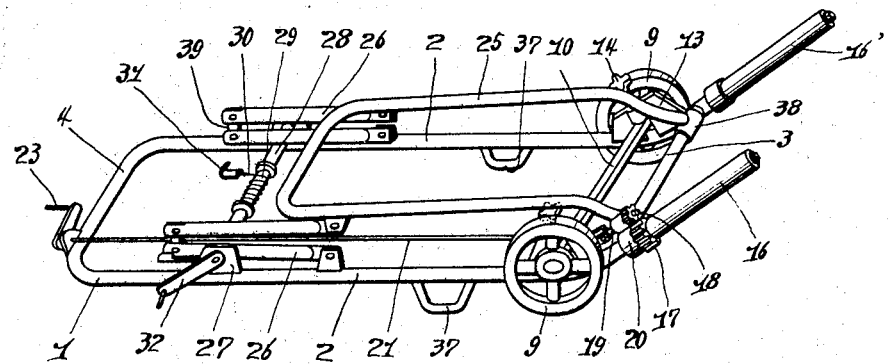
FIG. 3 is a perspective view thereof but in an inoperative or folded position.
Figure 4:
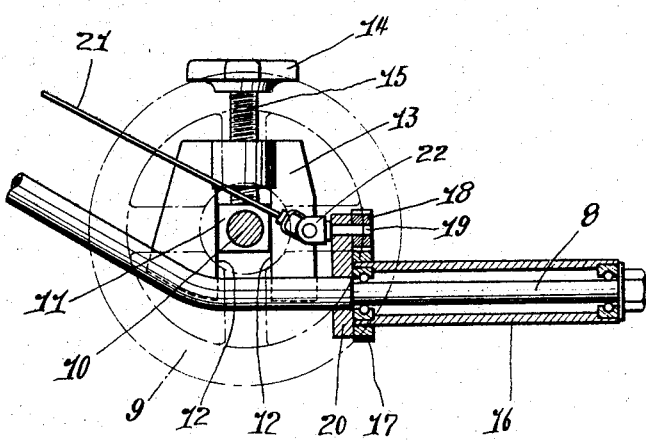
FIG. 4 is a partly removed and partly sectional enlarged left side elevational view showing a guide means and a means of an arm and cylindrical roller thereof.

A pair of collars 38 are rotatably mounted on the front lateral member 3 which is secured to the front part 6 of the longitudinal members 2 at right angles thereto between the guide member 13 and the bearing member 20. An inverted flat bottomed U-shaped supporting frame 25 is secured to the collars 38 at the ends thereof so that it is possible to swing longitudinally the supporting frame 25 on the front lateral member 3 together with the collars 38. The supporting frame 25 and the rear parts 7 of the longitudinal members 2 are connected with each other by means of a pair of collapsible stays 26, respectively. Each of the stays 26 is pivoted on the supporting frame 25 at one end thereof and on the rear part 7 on the other end thereof. In addition thereto, the two parts of stay 26 are pivoted to each other at the center thereof so as to be folded longitudinally, drawing the supporting frame 25 to the rear part 7 and bringing the former into the inoperative position as shown in FIG. 3. There is a conventional stabilizing means about the collapsible joint 39 of the stays 26 which serves for maintaining the supporting frame 25 in the upstanding position.

Figure 5:
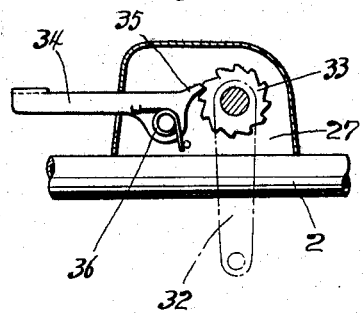
FIG. 5 is an enlarged view showing a ratchet wheel and pawl means thereof.

There are a pair of bearing blocks 27 on the upper sides of the longitudinal members 2 between the pivots of the stay 19 and the rearmost ends of the longitudinal members 2, respectively, whereby a laterally arranged rotary shaft 28 is journalled. The rotary shaft 28 is provided with a handle 32 secured thereto on an extremity thereof and a drum 29 secured thereto between the two bearing blocks 27 so as to rotate the drum 29 by the handle 32. A wire 30 is secured to the drum 29 at an end thereof and adapted to be wound on the drum 29. A hook 31 is provided at the free end of the wire 30 which will be referred to hereinafter with respect to the operation of this embodiment. A ratchet wheel 33 is secured to the rotary shaft 28 and in mesh with a pawl 35 loaded by a spring 36 inside one of the two bearing blocks 27 in a conventional manner. A lever 34 extended from the pawl 35 out of the bearing block 27 serves for detaining the ratchet wheel 33 and prevents the drum 29 from the rewinding motion of the wire 30, as shown in FIG. 5. A pair of legs 37 are provided, one on the underside of each rear part 7 of the longitudinal member 2 for supporting the auxiliary means on the ground.

In operation for dismantling a wheel from a car, the auxiliary means may be pushed longitudinally by hand using the rear lateral member 4 as a handle. Thus it is easy to insert the front ends of the cylindrical rollers 76 and 16' under a tire and wheel 24 of a car lifted by a jack (not shown), the tread of the tire 24 being arranged between the two rollers 16 and 16'. Then the knob 14 is turned for raising or lowering the auxiliary means, whereby the wheel 24 of the car is placed snugly on the two cylindrical rollers 16 and 16' as shown in FIG. 1. The supporting frame 25 is raised and stabilized in the operating position by locking the collapsible stay 26. If necessary, the tire and wheel 24 is turned by rotating the cylindrical roller 16 which is driven by turning the handle 23. The dismantling operation is done by disengaging the bolts of the bosses of the wheel 24 from the hub of the axle. The dismantled tire and wheel 24 is then leaned against the supporting frame 25 and, if necessary, drawn rearwards by anchoring the hook 31 on a suitable edge of the tire and wheel 24 and then pulling or drawing the wire 30 by turning the handle 32. The dismantled tire and wheel 24 stabilized on the two cylindrical rollers 16 and 16' may be transferred anywhere by moving the auxiliary means. By virtue of the supporting frame 25 and the hook 31, the tire and wheel 24 is not unloaded from the auxiliary means accidentally.

The installing operation may be effected in a reverse sequence. If a heavy wheel is placed on the ground, laying on the side, the front ends of the cylindrical rollers 16 and 16' is made to touch the tire and the wire 30 is extended so as to anchor the hook 31 to a suitable edge of the tire and wheel 24. By turning the handle 32 the tire and wheel 24 are gradually raised so as to be set on the two cylindrical rollers 16 and 16', letting the tire touch the rollers 16 and 16'. It is easily possible to transfer such standing tire and wheel 24 together with the auxiliary means anywhere. If the tire and wheel 24 is small enough to be carried between the two cylindrical rollers 16 and 16' so that the lower part of the wheel 24 descends too far downwards, the main frame 1 of the auxiliary means may be raised by turning the knob 14, whereby the tire is prevented from contact with the ground. In order to install the tire and wheel 24 once dismantled to the axle of the car again, it is necessary to align a number of holes provided in the boss of the wheel with such holes provided in the hub of the axle. For this end, it is necessary to turn the handle 23 so as to rotate the cylindrical roller 16, whereby the wheel 24 is rotated so as to align the holes with those formed in the hub. Such operation that the tire and wheel 24 is secured on the axle by screwing a bolt through the two holes is not directly related to this auxiliary means. After the installation of the tire and wheel 24 to the car has been finished, it is very easy to remove this means from the car.

Referring now to FIGS. 6 to 9, inclusively, another embodiment of this invention will be described. This embodiment is more pertinent to deal with a smaller tire and wheel 24 of a car than the ordinary one in the preceding example. In this embodiment, the main frame 1 is not able to be raised and lowered by the wheel 9 attached to said frame 1 and two additional wheels 9' are provided on the front ends of the arms 8. The supporting frame 25 is omitted because it would be unnecessary to let a tire and wheel 17 lean thereon when the wheel 24 is small. Although the cylindrical rollers 16 and 16' are rotatable on the arms 8 as in the preceding example, respectively, the roller 16 is not provided with such a driving means comprising the handle 23, the longitudinal rotary rod 21 and the two gears 17, 18 as in the preceding example. It would be easy to rotate the tire and wheel 24 held on the two rotatable cylindrical rollers 16 and 16' manually when the tire and wheel 24 is small. It is rather a feature of this embodiment that the cylindrical rollers 16 and 16' are able to slide longitudinally. There are two cams 40 pivoted on pins 41 laterally protruded on sides of bosses 42 which are upwards protruded on the front parts 6 of the frame, respectively. There is a transmissible plate 45 loosely and transversely mounted on the two arms 8 by holes in both ends thereof and interposed between each of the rear ends of the two cylindrical rollers 16 and 16' and each of the lower parts of the two cams 40 at the both ends thereof, respectively. The lower front sides of the cams 40 are adapted to push the cylindrical rollers 16 and 16' frontwards by the medium of the transmissible plate 45 when the upper parts of the cams 40 are inclined rearwards, respectively. The upper ends of the cams 40 are extended into a laterally extending lever 43, connecting the two cams 40 with each other, so that it is possible to operate the two cylindrical rollers 16 and 16' simultaneously by inclining the laterally extending lever 43. A coil spring 44 is compressed between the front end of each of the cylindrical rollers 16 and 16' and a flange 46 formed on the front end of the arm 8 around the same and serves for restoring the cylindrical rollers 16 and 16'. By virtue of the longitudinal motion of the cylindrical rollers 16 and 16', it is easier to displace a tire and wheel 24 of a car rearwards when the same is brought on the front end of the cylindrical rollers 16 and 16'.

While particular embodiments of the invention have been illustrated and described, modifications thereof will readily occur to those skilled in the art. It should be understood therefore that the invention is not limited to the particular structures disclosed but that the appended claims are intended to cover all modifications which do not depart from the true spirit and scope of the invention.

What is claimed as new and desired to be secured by Letters Patent of the United States is:

1. An auxiliary means for installing and dismantling a wheel and tire of a car, comprising a frame having a forward frame portion and a rearward handle portion for operation of the device by an operator; a pair of wheels supporting said forward frame portion; a pair of spaced rollers extending forwardly of said wheels; and operating means on said frame and operatively connected to at least one of said rollers and being operable for moving said roller and thereby said tire and having operator-controlled means adapted to be operated by an operator, said operating means comprising first means operatively connected to at least one of said rollers for moving said rollers in a longitudinal direction and second means for effecting return of said rollers to a normal position.

2. An auxiliary means as defined in claim 1, said second means being resilient means.

3. An auxiliary means as defined in claim 1; and further comprising a supporting frame pivotally mounted on said frame, and collapsible means for retaining said supporting frame in an upright position and being collapsible to allow folding of said supporting frame into an inoperative position.

4. An auxiliary means as defined in claim 1; said operating means further comprising means operatively associated with one of said rollers for effecting rotation thereof.

5. An auxiliary means as defined in claim 1; and further comprising means for raising and lowering said frame relative to the ground.

6. An auxiliary means as defined in claim 1, said operating means comprising means for effecting rotation of said roller about its axis; and further comprising means for raising and lowering the frame relative to the ground.

7. An auxiliary means as defined in claim 1; further comprising means operatively connected to one of said rollers for effecting rotation of said roller and including gear means operatively connected with said roller and means located adjacent said handle portion and operable for actuating said gear means.

8. An auxiliary means for installing and dismantling a wheel of a car comprising, a frame including a pair of spaced longitudinal members and at least a pair of spaced lateral members each connected to both of said longitudinal members with one of said lateral members being positioned adjacent each end of said longitudinal members with the rear one of said lateral members being adapted to be used as a handle for operating said means in cooperation with said wheels, said longitudinal members each having an upward bend in a part near the connection of said lateral member adjacent the forward ends of said longitudinal members, a pair of wheels mounted on said frame for longitudinal movement of said frame, a pair of spaced cylindrical rollers carried by said frame and operating means on said frame operatively connected to at least one of said rollers and being operable for moving said roller and thereby said tire, and having operator controlled means adapted to be operated by an operator, a cylindrical roller driving means, a supporting frame, a hooking means, and an adjusting means to adjust the height of said auxiliary means, said cylindrical roller driving means comprising a gear formed on the rear end of one of said two cylindrical rollers integrally therewith, and another gear in mesh with said gear and adapted to be rotated by a handle through the medium of a longitudinal rotary rod so as to rotate said cylindrical roller by said handle; said supporting frame being longitudinally swingably mounted on the front one of said lateral members and adapted to be stabilized at an upstanding position; said hooking means comprising a hook provided on the free end of a wire secured on a drum at the other end thereof, said drum being formed on a shaft laterally arranged and rotatably carried by said longitudinal members, a handle provided on extremity of said shaft for pulling said hook towards said drum winding said wire thereon, and a ratchet wheel and pawl means for locking said drum at any position; and said adjusting means to adjust the height of said auxiliary means comprising a pair of guide members for guiding an axle upwards and downwards keeping said axle in parallel with said lateral members, said wheels being rotatably mounted on the extremities of said axle.

9. An auxiliary means for installing and dismantling a wheel of a car comprising, a frame including a pair of spaced longitudinal members and at least a pair of spaced lateral members each connected to both of said longitudinal members with one of said lateral members being positioned adjacent each end of said longitudinal members with the rear one of said lateral members being adapted to be used as a handle for operating said means in cooperation with said wheels, said longitudinal members each having an upward bend in a part near the connection of said lateral member adjacent the forward ends of said longitudinal members, a pair of wheels mounted on said frame for longitudinal movement of said frame, a pair of spaced cylindrical rollers carried by said frame and operating means on said frame operatively connected to at least one of said rollers and being operable for moving said roller and thereby said tire, and having operator controlled means adapted to be operated by an operator; and a sliding means to slide cylindrical rollers which comprises a pair of cams pivoted on said front parts and adapted to push said cylindrical rollers frontwards against the action of coil springs compressed between said cylindrical rollers and the front ends of said arms, respectively, said cams being extended upwards into a lever so as to slide said cylindrical rollers frontwards on said arms by inclining said lever.

References Cited

UNITED STATES PATENTS

| | | | |
|---|---|---|---|
| 2,364,918 | 12/1944 | Roberson | 214—331 |
| 2,545,440 | 3/1951 | Barber | 214—331 |
| 2,231,192 | 2/1941 | Olsen | 214—332 |
| 2,471,051 | 5/1949 | Tway | 214—330 |
| 2,525,437 | 10/1950 | Winzter et al. | 214—331 |
| 2,613,084 | 10/1952 | Burch | 214—330 |
| 2,640,604 | 6/1953 | Curley | 214—331 |

HUGO O. SCHULZ, *Primary Examiner.*